US010964053B2

(12) United States Patent
Sinha et al.

(10) Patent No.: US 10,964,053 B2
(45) Date of Patent: Mar. 30, 2021

(54) DEVICE POSE ESTIMATION USING 3D LINE CLOUDS

(71) Applicant: Microsoft Technology Licensing, LLC, Redmond, WA (US)

(72) Inventors: Sudipta Narayan Sinha, Kirkland, WA (US); Pablo Alejandro Speciale, Redmond, WA (US); Sing Bing Kang, Redmond, WA (US); Marc Andre Leon Pollefeys, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 16/025,120

(22) Filed: Jul. 2, 2018

(65) Prior Publication Data

US 2020/0005486 A1  Jan. 2, 2020

(51) Int. Cl.
*G06T 7/73* (2017.01)
*G06T 7/33* (2017.01)
*G06K 9/00* (2006.01)

(52) U.S. Cl.
CPC ............ *G06T 7/74* (2017.01); *G06T 7/337* (2017.01); *G06K 9/00201* (2013.01); *G06K 2209/40* (2013.01); *G06T 2200/04* (2013.01); *G06T 2207/10028* (2013.01); *G06T 2207/30244* (2013.01); *G06T 2210/56* (2013.01)

(58) Field of Classification Search
CPC . G06T 2207/30244; G06T 7/74; G06T 7/337; G06T 2207/10028; G06T 2200/04; G06K 9/00201; G06K 2209/40
See application file for complete search history.

(56) References Cited

U.S. PATENT DOCUMENTS

| 8,798,357 | B2 | 8/2014 | Sinha et al. | |
|---|---|---|---|---|
| 9,886,774 | B2 | 2/2018 | Fathi et al. | |
| 2011/0205338 | A1* | 8/2011 | Choi | G06T 7/74 |
| | | | | 348/46 |
| 2014/0368645 | A1* | 12/2014 | Ahuja | G06T 7/75 |
| | | | | 348/143 |
| 2016/0098858 | A1* | 4/2016 | Patkar | G06T 7/593 |
| | | | | 345/420 |
| 2016/0210783 | A1* | 7/2016 | Tomlin | G02B 27/00 |

(Continued)

OTHER PUBLICATIONS

Borges, et al., "Vision-based Localization Using an Edge Map Extracted from 3D Laser Range Data", in Proceedings of International Conference on Robotics and Automation, May 3, 2010, pp. 4902-4909.

(Continued)

*Primary Examiner* — Kenny A Cese
(74) *Attorney, Agent, or Firm* — Alleman Hall Creasman & Tuttle LLP

(57) ABSTRACT

Computing devices and methods for estimating a pose of a user computing device are provided. In one example a 3D map comprising a plurality of 3D points representing a physical environment is obtained. Each 3D point is transformed into a 3D line that passes through the point to generate a 3D line cloud. A query image of the environment captured by a user computing device is received, the query image comprising query features that correspond to the environment. Using the 3D line cloud and the query features, a pose of the user computing device with respect to the environment is estimated.

17 Claims, 11 Drawing Sheets

(56) References Cited

U.S. PATENT DOCUMENTS

2017/0124714 A1* 5/2017 Sridhar .................. B25J 9/1697
2020/0126256 A1 4/2020 Sinha et al.

OTHER PUBLICATIONS

Lee, et al., "Line-Based Recognition Using 3D Lines and Occlusion Query", in Proceedings of International Conference on Information Science and Applications, Apr. 21, 2010, 8 Pages.

Li, et al., "Worldwide Pose Estimation Using 3D Point Clouds", in European Conference on Computer Vision, Oct. 7, 2012, pp. 15-29.

"International Search Report and Written Opinion Issued in PCT Patent Application No. PCT/US2019/038794", dated Oct. 23, 2019, 12 Pages.

Pribyl, et al., "Camera Pose Estimation from Lines using Plucker Coordinates", in repository of arXiv, arXiv:1608.02824, Aug. 9, 2016, pp. 1-12.

"Non Final Office Action Issued in U.S. Appl. No. 16/168,601", dated Mar. 11, 2020, 5 Pages.

Andres, et al., "Geo-Indistinguishability: Differential Privacy for Location-Based Systems", in Proceedings of the ACM SIGSAC Conference on Computer and Communications Security, Nov. 4, 2013, pp. 901-914.

"International Search Report and Written Opinion Issued in PCT Application No. PCT/US2019/056283", dated Dec. 16, 2019, 11 Pages.

Speciale, et al., "Privacy Preserving Image-Based Localization", in Repository of arxiv, arXiv:1903.05572 [cs.CV], Mar. 13, 2019, 11 Pages.

"Scale-invariant feature transform", Retrieved From: https://en.wikipedia.org/wiki/Scale-invariant_feature_transform, Retrieved on: Sep. 18, 2018, 15 Pages.

Camposeco, et al., "Hybrid Camera Pose Estimation", in Proceedings of IEEE Conference on Computer Vision and Pattern Recognition, Jun. 18, 2018, pp. 136-144.

Dosovitskiy, et al., "Inverting Visual Representations with Convolutional Networks", in Proceedings of the IEEE Conference on Computer Vision and Pattern Recognition, Jun. 26, 2016, pp. 4829-4837.

Fraundorfer, et al., "A Minimal Case Solution to the Calibrated Relative Pose Problem for the Case of Two Known Orientation Angles", in Proceedings of European Conference on Computer Vision, Sep. 5, 2010, pp. 1-15.

Khoshelham, Kourosh, "Direct 6-DoF Pose Estimation from Point-Plane Correspondences", in Proceedings of International Conference on Digital Image Computing: Techniques and Applications (DICTA), Nov. 23, 2015, 6 Pages.

Kniep, et al., "Efficient computation of relative pose for multi-camera systems", in Proceedings of IEEE Conference on Computer Vision and Pattern Recognition, Jun. 23, 2014, 8 Pages.

Lee, et al., "Relative pose estimation for a multi-camera system with known vertical direction", in Proceedings of IEEE Conference on Computer Vision and Pattern Recognition, Jun. 23, 2014, pp. 1-8.

Li, et al., "A linear approach to motion estimation using generalized camera models", in Proceedings of IEEE Conference on Computer Vision and Pattern Recognition, Jun. 23, 2008, 8 Pages.

Lim, et al., "Real-time monocular image-based 6-DoF localization", in International Journal of Robotics Research, vol. 34, Issue 4-5, Apr. 3, 2015, pp. 476-492.

Nister, David, "A Minimal Solution to the Generalized 3-Point Pose Problem", in Proceedings of IEEE Computer, Society Conference on Computer Vision and Pattern Recognition, Jun. 27, 2004, 8 Pages.

Nister, David, "An efficient solution to the five-point relative pose problem", in Journal of IEEE Transactions on Pattern Analysis and Machine Intelligence, vol. 26, Issue 6, Jun. 2004, pp. 756-770.

Ramalingam, Srikumar, "A theory of minimal 3D point to 3D plane registration and its generalization", in International Journal of Computer Vision, vol. 102, Issue 1-3, Sep. 27, 2012, 20 Pages.

Ramalingam, et al., "P2Pi: A Minimal Solution for Registration of 3D Points to 3D Planes", in Proceedings of European Conference on Computer Vision, Nov. 2010, 16 Pages.

Stewenius, et al., "Solutions to minimal generalized relative pose problems", in Proceedings of 6th Workshop on Omnidirectional Vision Camera Networks and Non-Classical Cameras, Oct. 21, 2005, 8 Pages.

Sweeney, et al., "Efficient computation of absolute pose for gravity-aware augmented reality", in Proceedings of IEEE International Symposium on Mixed and Augmented Reality, Sep. 29, 2015, pp. 19-24.

Sweeney, Chris, et al., "gDLS: A Scalable Solution to the Generalized Pose and Scale Problem", in Proceedings of European Conference on Computer Vision, Sep. 6, 2014, pp. 16-31.

Sweeney, Chris, et al., "Solving for Relative Pose with a Partially Known Rotation is a Quadratic Eigenvalue Problem", in Proceedings of 2nd International Conference on 3D Vision, Dec. 8, 2014, 8 Pages.

Weinzaepfel, et al., "Reconstructing an image from its local descriptors", in Proceedings of Computer Vision and Pattern Recognition, Jun. 20, 2011, 9 Pages.

\* cited by examiner

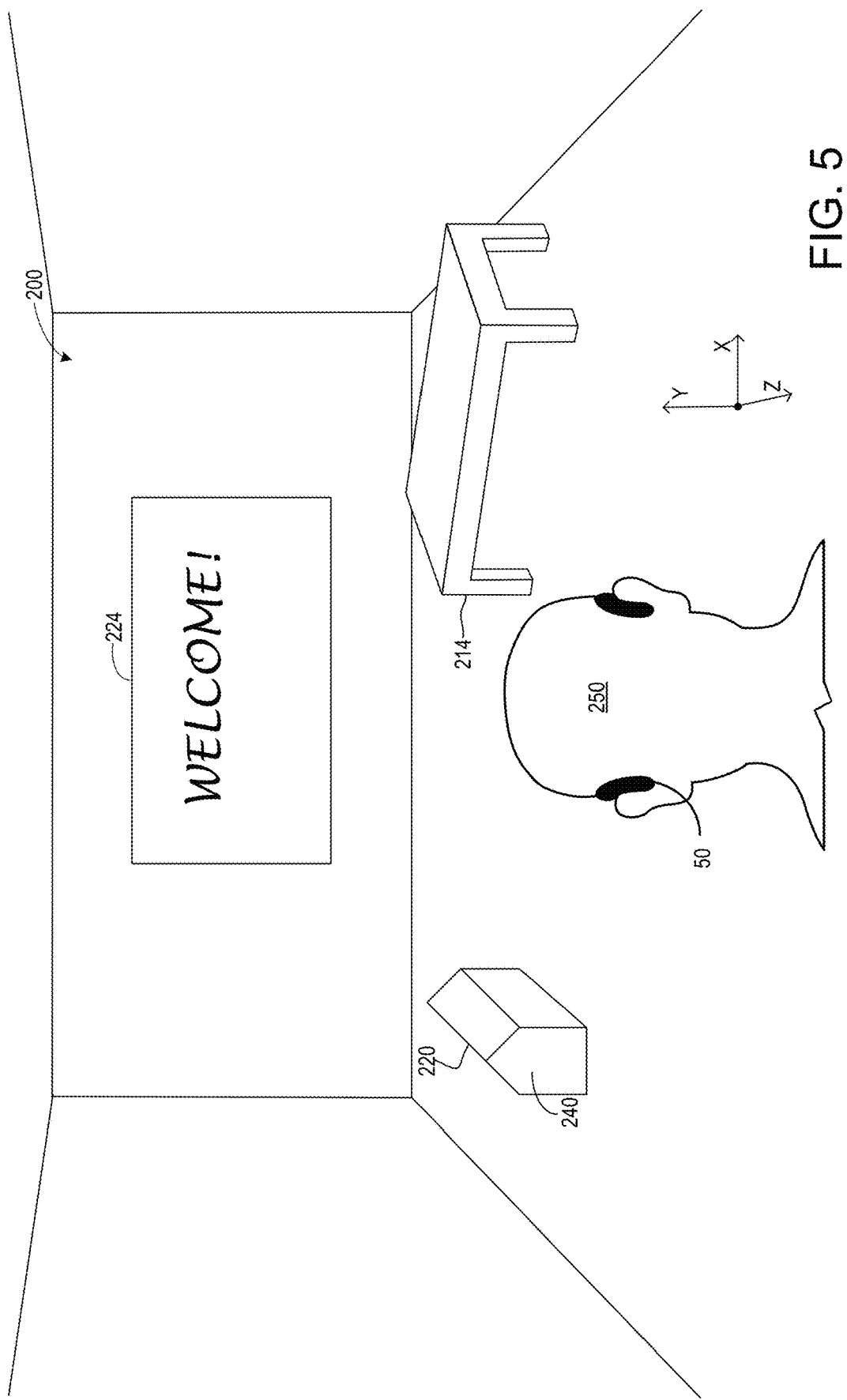

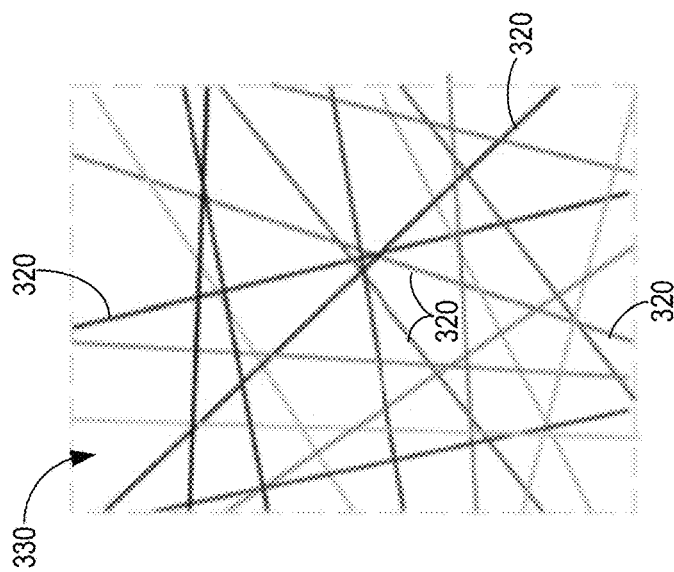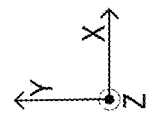
FIG. 8
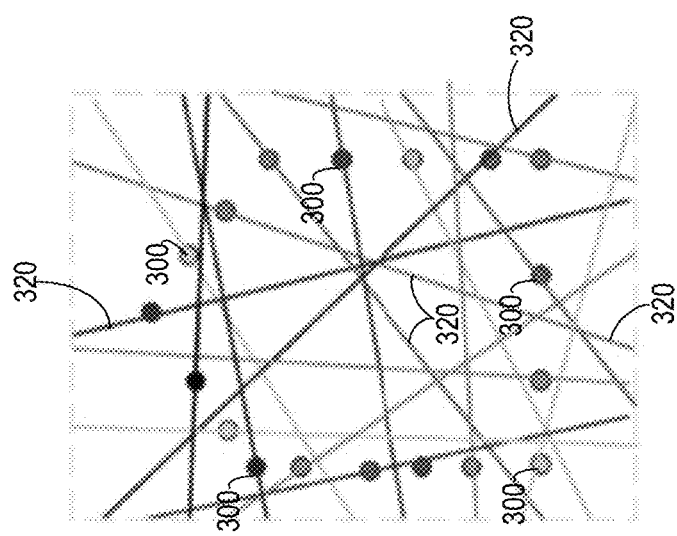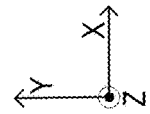
FIG. 7
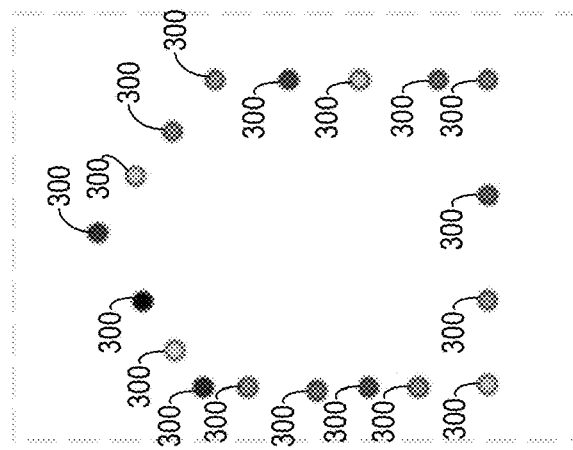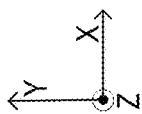
FIG. 6

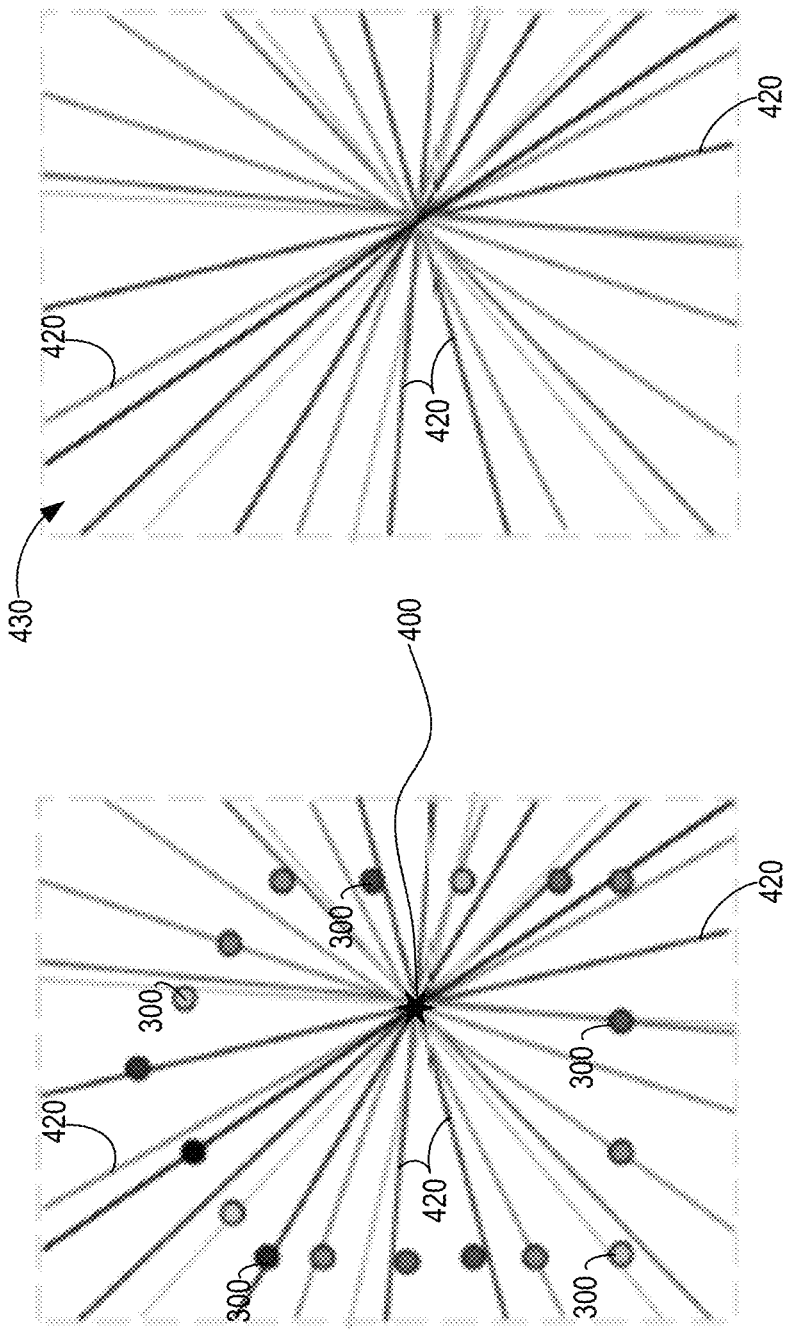
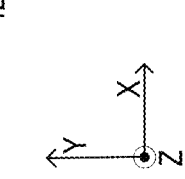
FIG. 9
FIG. 10

DEVICE POSE ESTIMATION USING 3D LINE CLOUDS

BACKGROUND

Image-based localization techniques may be utilized by mobile display devices, robots, drones and other devices to estimate their position and orientation in a physical space. In some examples one or more images captured by a device may be compared to a precomputed map representing a 3D reconstruction of the space. In some examples the precomputed map may include sensitive information.

SUMMARY

Various examples are disclosed herein that relate to image-based camera pose determinations. For example, a method may comprise obtaining a three-dimensional map comprising a plurality of three-dimensional points representing a physical environment. Each three-dimensional point is transformed into a three-dimensional line that passes through the point to generate a three-dimensional line cloud. A query image of the physical environment captured by a user computing device is received, with the query image comprising a plurality of query features that correspond to at least a portion of the physical environment. Using the three-dimensional line cloud and the plurality of query features, a pose of the user computing device with respect to the physical environment is estimated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a schematic depiction of the room of FIG. 2 at a later time and a user wearing a head-mounted display device according to examples of the present disclosure.

FIG. 6 is a simplified depiction of a portion of the three-dimensional points from the three-dimensional map of FIG. 4 according to examples of the present disclosure.

FIG. 7 is a schematic depiction of a three-dimensional line passing through each of the three-dimensional points of FIG. 6 to form a line cloud according to examples of the present disclosure.

FIG. 8 is a schematic illustration of the three-dimensional line cloud of FIG. 7 with the three-dimensional points removed according to examples of the present disclosure.

FIG. 9 is a schematic depiction of the three-dimensional points of FIG. 6 with a three-dimensional line passing through each of the points and through an anchor location to form a line cloud according to examples of the present disclosure.

FIG. 10 is a schematic illustration of the three-dimensional line cloud of FIG. 9 with the three-dimensional points removed according to examples of the present disclosure.

DETAILED DESCRIPTION

Figure 1:
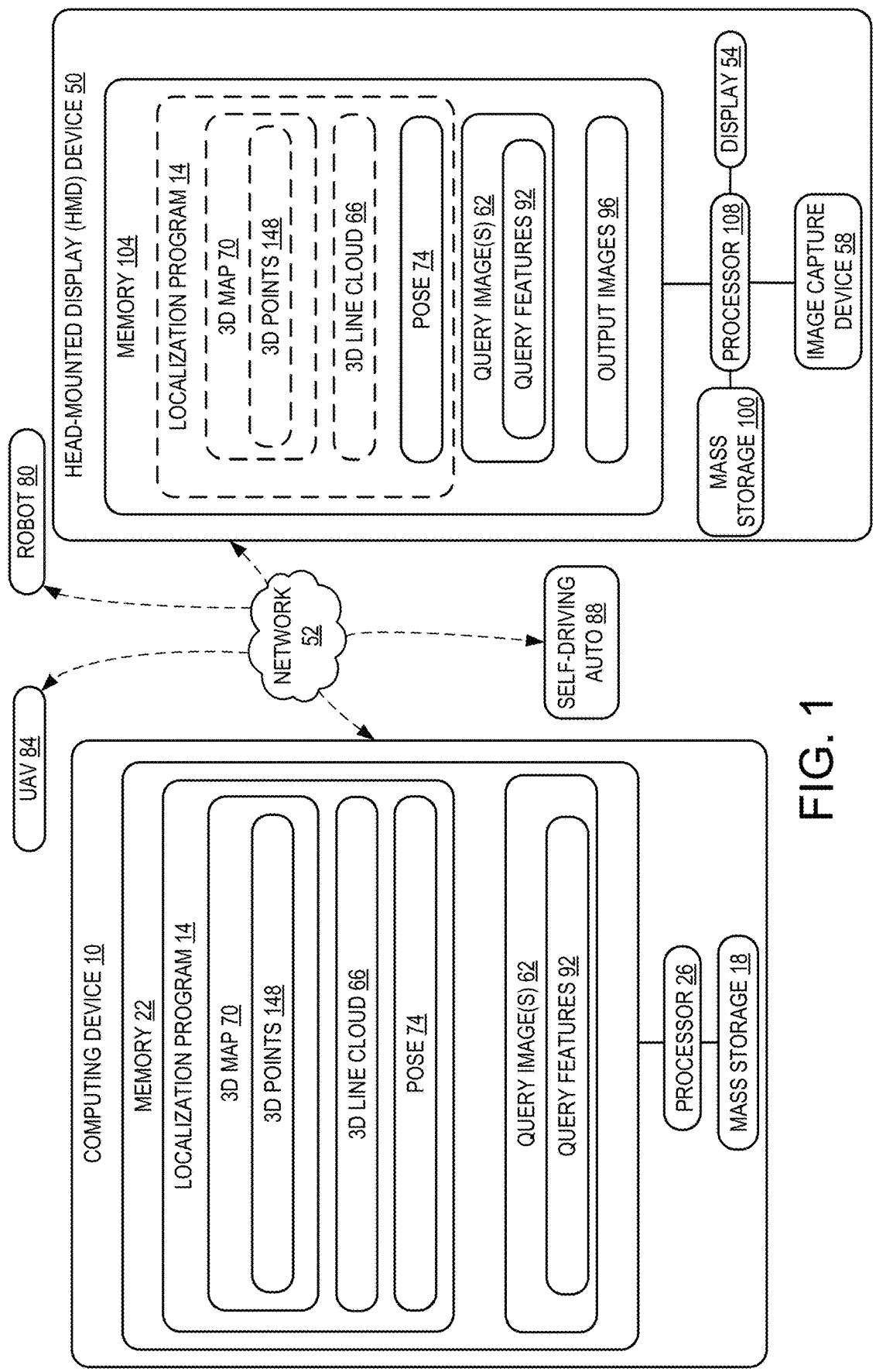
FIG. 1 is a schematic depiction of a computing device and user computing devices for performing image-based pose determinations according to examples of the present disclosure.

A wide variety of devices and related technologies may utilize image-based localization techniques. Examples may include wearable computing devices, such as head-mounted display (HMD) devices that provide augmented reality and/or virtual reality experiences, robotic machines, self-driving automobiles, and unmanned aerial vehicles. These and other devices may use image-based localization techniques to determine their position and orientation in a physical space.

Some approaches to image-based localization utilize knowledge of a prior three-dimensional (3D) map or scene model of a physical environment that has been pre-computed offline. The 3D map is essentially a spatial database containing geometric data. In some examples, the geometric data comprises a plurality of 3D points that form a 3D point cloud reconstruction of the scene. The 3D points are associated with feature descriptors extracted from the source images used to construct the map. A database comprising the 3D point cloud and feature descriptors is constructed during an offline phase using images and/or video acquired during a mapping phase of the physical environment.

Given a 3D map of a physical environment that has been computed offline and using one or more images captured by a camera of a user computing device, an image-based localization task may estimate the 3D position (x, y, z) and 3D orientation (roll, pitch, yaw) of the device within the physical environment. Camera localization algorithms may solve this task in two steps—first by matching features in the query image(s) to features associated with 3D scene landmarks stored in the 3D map. Next, the 6 degree-of-freedom (6DOF) pose of the camera may be computed using the 2D to 3D feature matches and their underlying coordinates. A variety of localization algorithms may be utilized to compute the camera pose in this manner. For example, descriptions of exemplary techniques and algorithms for image-based localization are described in U.S. Pat. No. 8,798,357, entitled "Image-Based Localization", the entire contents of which are incorporated by reference herein.

In some examples the pre-computed 3D map may include sensitive, confidential and/or private information related to the mapped environment. In a variety of situations and for a variety of reasons, it may be desirable to reveal and make available as little information as possible about the 3D point cloud and the corresponding scene. For example, the 3D point cloud may reflect geometric attributes and the visual appearance of the overall scene, objects that were present in the scene at the time of mapping, information about the spatial structure and layout of the scene, etc. Even in examples where the images acquired during the mapping phase are not stored with the 3D map, the 3D map will store information extracted from those images—namely, the 3D point cloud and the associated feature descriptors which indirectly encodes some of the scene appearance and geometry at the time of mapping.

This 3D map or database may be stored and used later for answering localization queries. When a localization query image is presented, features extracted from the query image are first compared against the features stored in the map. The matches are then passed to an absolute pose solver which may calculate the 6D camera pose.

In some examples, a person who gains access to this 3D map data could potentially infer confidential information about objects present in the scene at the time of mapping, and/or information about the spatial structure and layout of the scene. For example, and as discussed in the use case examples described below, a 3D map of a secure location may be generated and stored to provide localization services to third parties and devices that will be present in the location at a later time. When the environment was mapped, there may have been confidential objects in the scene, such as prototypes of new products being designed at the facility. During mapping these objects are reconstructed along with everything else in the scene, and this data is stored in the 3D point cloud of the environment.

At a future date, the confidential objects are removed from the location, and other parties may visit the location and run a localization application on their devices. However, anyone who has access to the 3D point cloud that was generated when the confidential objects were present may be able to discern proprietary information about the objects from the map. Such parties also may determine information about the general scene layout of the private location. For example, a party may use a 3D interactive viewer or other surface reconstruction techniques to interpret the 3D point cloud data and the underlying scene geometry at the time of mapping.

In some examples, a person not currently located in a particular space may attempt to fraudulently gain access to a 3D map of the space via location spoofing attempts. Additionally, given that feature descriptors may potentially allow the reconstruction of an image, similar techniques may be used with 3D coordinates from a 3D map to generate a reconstructed view that may be close to the original view used to build the map.

In other examples, another potential privacy attack may involve attempting to guess the appearance of the original scene by reconstructing the original images that were used to build the original 3D point cloud map, even though such images were discarded after the map was built. This type of attack could be carried out by first projecting all or a subset of the 3D points in a 3D point cloud map into a certain camera viewpoint. Such projection would produce a set of local descriptors, with each having a 2D image location obtained by projecting the corresponding 3D point.

Next, a reconstruction algorithm may be run to obtain a color (RGB) image. For example, such a reconstruction algorithm may be based on the output of known local description software techniques, such as those used for image indexing. Using an image database, patches that are visually similar to each region of interest of the unknown input image may be located according to associated local descriptors. These patches may be warped into input image domain according to interest region geometry and stitched together. Texture-free regions that are still missing may be completed by smooth interpolation. Examples of reconstruction algorithms that may be used to reconstruct an image from its local descriptors are described in the publication "Reconstructing an image from its local descriptors," Weinzaepfel, et al., *Computer Vision and Pattern Recognition*, June 2011, Colorado Springs, United States. Other example methods for obtaining a color image in this manner are described in the publication "Inverting Visual Representations with Convolutional Networks," Dosovitskiy, et al., *Proceedings of the IEEE Conference on Computer Vision and Pattern Recognition*, June 2016, Las Vegas, Nev., United States.

Accordingly, and as described in more detail below, examples of the present disclosure may address the above confidentiality/privacy concerns and potential attacks, and may protect against unauthorized access to and reconstruction of sensitive information. The examples described herein provide computing devices and methods that enable secure image-based localization using 3D maps comprising 3D point clouds. In some examples, aspects of the present disclosure operate to obfuscate the 3D point cloud data in a manner that prevents it from being interpretable by a human and also makes it extremely difficult or impossible for algorithms to infer the actual scene geometry from the obfuscated data. For example and as described below, by hiding an underlying 3D structure the disclosed methods may prevent the projection of 3D points to a 2D image plane. Additionally, the methods and devices of the present disclosure provide secure image-based localization techniques while maintaining desirable accuracy and precision of the localization.

Examples of image-based localization using 3D maps comprising 3D point clouds will now be provided. As described in use case examples discussed below, each 3D point of the 3D map may be transformed into a 3D line to generate a 3D line cloud. Using the 3D line cloud and query features from a query image, a pose of the user computing device with respect to the physical environment may be estimated.

FIG. 1 schematically illustrates a computing device 10 and a user computing device in the form of an HMD device 50 according to examples of the present disclosure. The computing device 10 includes a localization program 14 comprising instructions that may be stored in mass storage 18. The localization program 14 may be loaded into memory 22 and executed by a processor 26 to perform one or more of the methods and processes described herein. Additional details regarding the components and computing aspects of the computing device 10 are described in more detail below with reference to FIG. 14.

In different examples, the computing device 10 may take the form of a server, networking computer, gaming console, mobile communication device, desktop computer, laptop computer, tablet computer, set-top box (e.g. cable television box, satellite television box), or any other type of suitable computing device. In one example, computing device 10 may be integrated into a user computing device such that the user computing device comprises the computing device 10. Additional details regarding the components and computing aspects of computing device 10 are described in more detail below with respect to FIG. 14.

In some examples, the computing device 10 may be communicatively coupled with one or more other computing devices using a wired connection or may employ a wireless connection via Wi-Fi, Bluetooth, or any other suitable wireless communication protocol. As shown in FIG. 1, such other computing devices may include a user computing device in the form of an HMD device 50. For example, the computing device 10 and HMD device 50 may be communicatively coupled via a network 52. The network 52 may take the form of a local area network (LAN), wide area network (WAN), wired network, wireless network, personal area network, cellular network, or a combination thereof, and may include the Internet.

The HMD device 50 may comprise a wearable display device that provides an augmented reality and/or virtual reality experience to the user. In one example, the HMD device 50 may include a partially transparent display 54 that blends a user's view of the real world with displayed virtual objects and other content. The HMD device 50 also may include one or more image capture device(s) 58 that may capture one or more query images 62 of a physical environment in which the HMD device is located. In some examples, the image capture device(s) 58 may comprise an RGB camera, IR camera, and/or depth camera (such as a time-of-flight, structured light, or other form of depth camera).

As described in more detail below, such query images 62 along with a 3D line cloud 66 generated from a 3D map 70 of the environment may be utilized to estimate a pose 74 of the HMD device 50 with respect to the physical environment. In other examples, a variety of other user computing devices may be utilized with aspects of the present disclosure, including robotic machines 80, unmanned aerial vehicles (UAVs) 84, self-driving automobiles 88, and any other device that utilizes image-based localization. Additional details regarding the components and computing aspects of the HMD device 50 are described in more detail below with reference to FIG. 14.

In the following use case example described below, computing device 10 generates a 3D line cloud 66 from a 3D map 70. Using the 3D line cloud 66 and query features 92 from one or more query images 62 received from the HMD device 50, computing device 10 estimates a pose 74 of the user computing device with respect to a physical environment. The pose 50 is then sent to the HMD device 50. The HMD device 50 may utilize the pose 50 to display one or more output images 96 via the display 54. For example, the HMD device 50 may utilize the pose 74 to accurately position and display holographic images to appear within the physical environment. A holographic image can be generated by rendering a 3D model onto the current view seen by the image capture device 58. In this example, the 3D maps 70 are stored on the computing device 10 or other remote database and are not sent to the HMD device 50 or other end user devices.

In other use case examples, one or more of the foregoing functions may be performed by the HMD device 50. For example, HMD device 50 may download the 3D line cloud 66 from computing device 10 via network 52 into memory 104. In these examples, pose estimation may be performed by the HMD device 50 in real time. In some examples, the localization program 14 or aspects thereof may be stored in mass storage 100 of HMD device 50, loaded into memory 104 and executed by a processor 108 to perform aspects of the present disclosure described herein. In some examples, computing device 10 may perform some aspects of the present disclosure, such as generating a 3D line cloud 66, and HMD device 50 may perform other aspects of the present disclosure, such as using the 3D line cloud and query features to estimate a pose of the HMD device with respect to the physical environment. In these examples, the HMD device 50 may download a 3D map 70 and locally run computations to estimate the pose of the device. In some examples and as noted above, HMD device 50 may be a standalone device that performs all the methods and techniques described herein for generating and using a 3D line cloud to estimate a pose of a user computing device with respect to a physical environment.

Figure 2:
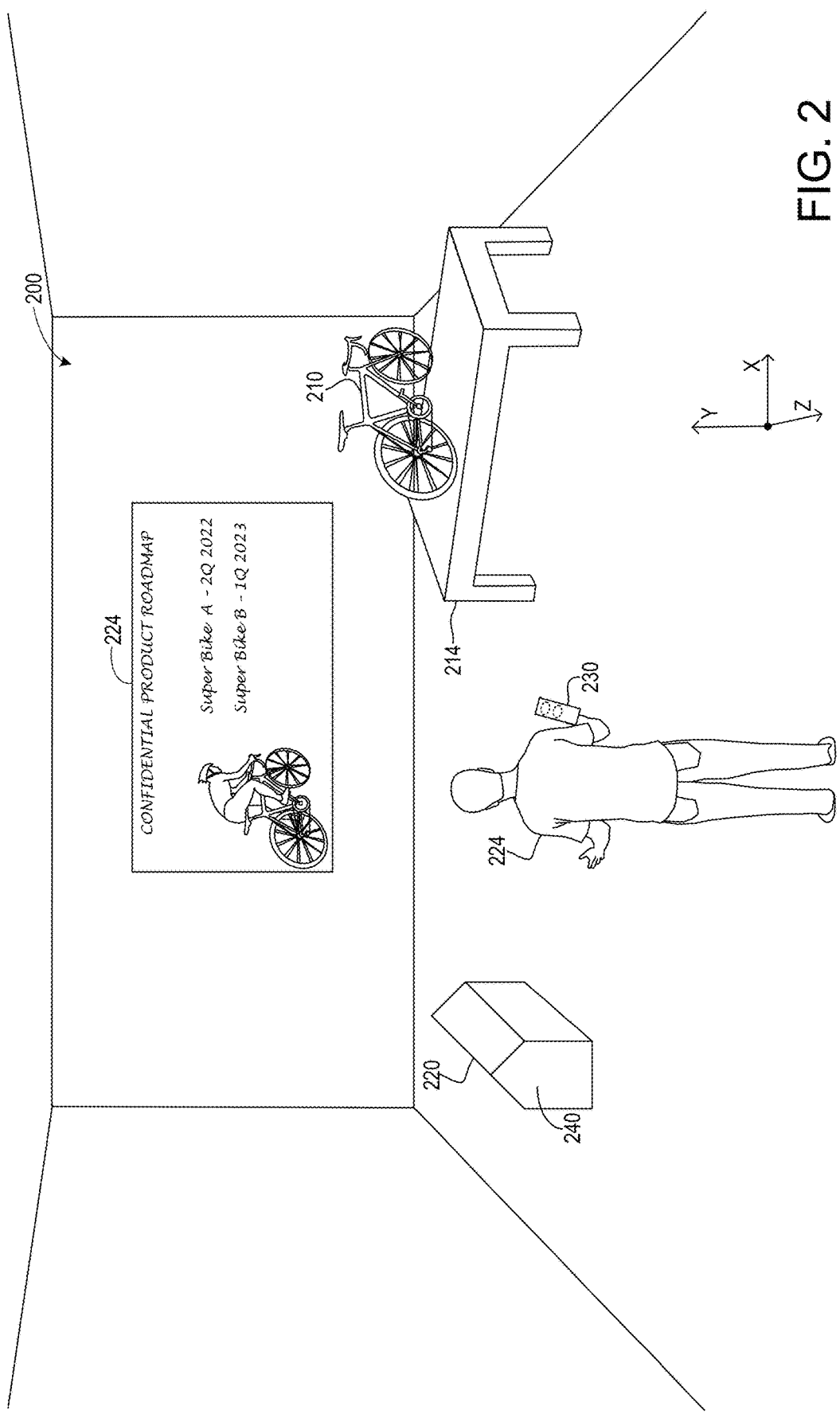
FIG. 2 is a schematic depiction of a room in which images may be captured to generate a three-dimensional map comprising three-dimensional points representing aspects of the room according to examples of the present disclosure.

With reference now to FIG. 2, in one example a work room 200 in a research and development lab of a bicycle company may house a prototype 210 of a top-secret road bike that is under development. The prototype 210 sits on a table 214 in the room 200. Also present in the room 200 is a box 220 and a wall-mounted whiteboard 224.

To enable image-based localization devices to be used in the room 200, a 3D map of the room 200 may be generated. In one example, a person 224 may move a camera 230 around the room 200 to capture images and/or video of the room that may be utilized to generate a 3D map of the room. In different examples the captured images may be of a variety of image types, such as grayscale images, color images, depth images, etc. It will be appreciated that the 3D map of the room 200 may be generated in a variety of manners using any suitable image capture devices.

Figure 3:
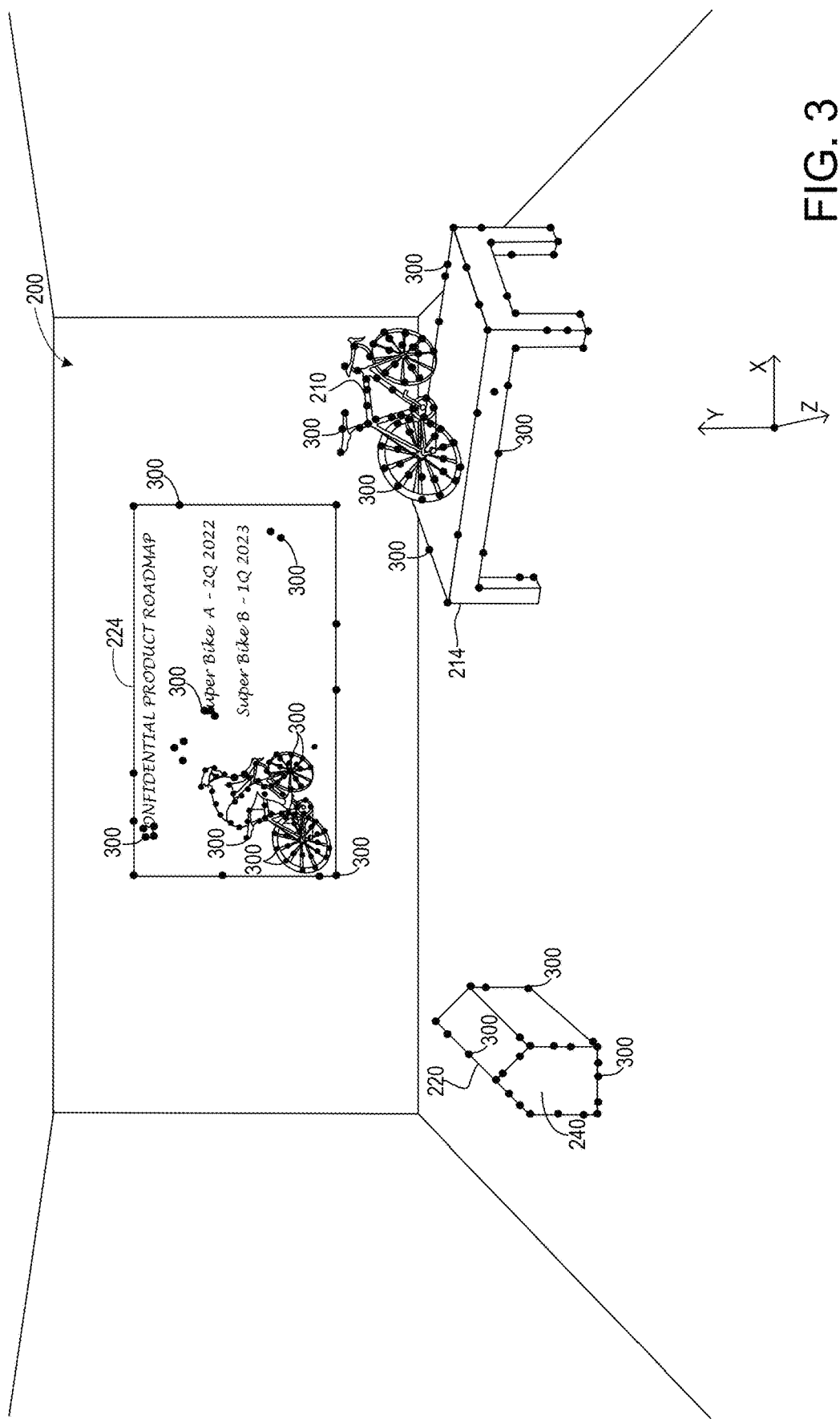
FIG. 3 is schematic depiction of the room of FIG. 2 showing a portion of the three-dimensional points representing aspects of the room according to examples of the present disclosure.

As noted above, the 3D map of the room 200 may comprise a plurality of 3D points representing the room 200. The collection of 3D points may be characterized as a 3D point cloud representing a reconstruction of the room 200. FIG. 3 is a schematic depiction of the room 200 showing a plurality of 3D points 300 that form a portion of a 3D point cloud describing the room. For visual clarity purposes, only a portion of 3D points 300 that make up the 3D point cloud of room 200 are illustrated. Accordingly, and in the example of FIG. 3, the 3D point cloud representing the room 200 includes additional 3D points that are not illustrated. In some examples, a 3D point cloud may include 20,000, 30,000 or more 3D points that denote various locations on surfaces within a physical environment. In some examples, a 3D map may also contain 3D line segments that may represent straight line patterns in the scene, straight line edges or boundaries of planar surfaces (such as table 214), and/or straight-line creases between planar surfaces in the scene.

As noted above, each of the 3D points are associated with feature descriptors extracted from the source images that are used to construct the 3D map. A feature descriptor may comprise a multi-dimensional vector that encodes the appearance of a surface around a 3D point. For example, an image patch (such as 32×32 pixels) around a given pixel of a 3D point may encode the appearance of a surface around that point into a feature descriptor that is more compact.

It will be appreciated that feature descriptors may not be generated at every 3D pixel of a 3D point cloud. In some examples, feature descriptors may be selectively generated at distinguishing features of the map, such as corners, highly textured areas, etc. In this manner, query features of similar distinguishing features extracted from query images may be more easily matched with corresponding feature descriptors in the 3D map. Additionally, in some examples an initially-generated point cloud may be decimated to reduce the density of 3D points contained in the cloud. For example, a subset of representative 3D points may be selected in the point cloud, and non-selected 3D points within a predetermined distance of the selected 3D points may be discarded. In this manner, the resulting decimated 3D point cloud may be more quickly downloaded to a user computing device and may be less vulnerable to malicious interpretation by third parties gaining access to the 3D point cloud.

Figure 4:
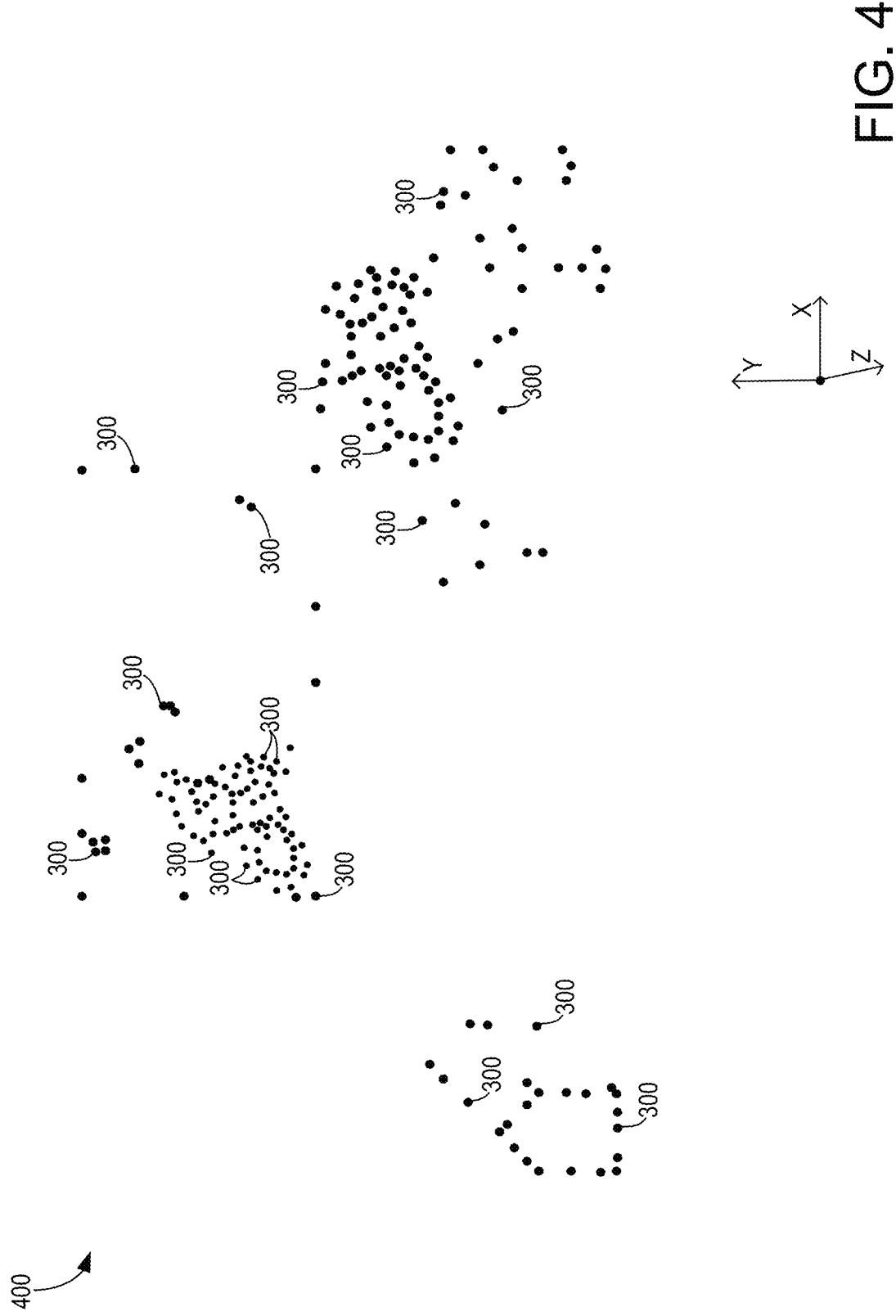
FIG. 4 is a schematic depiction of the three-dimensional points of FIG. 3 forming a portion of a three-dimensional map according to examples of the present disclosure.

With reference now to FIG. 4, a portion of a 3D point cloud 400 comprising the 3D points 300 from FIG. 3 representing room 200 is illustrated. As shown in this example, the 3D point cloud 400 may reflect geometric attributes and the visual appearance of objects that are present in the room 200 at the time of mapping. In the present example, the 3D point cloud 400 includes 3D points 300 that correspond to the shape, dimensions and other features of the confidential bike prototype 210, the image of the bike and the text displayed on whiteboard 224, as well as other objects and geometric features of the room 200.

With reference now to FIG. 5, later a visitor 250 may enter the room 200 as part of a tour of the bicycle factory. In anticipation of hosting visitors, the confidential bike prototype 210 has been removed from the room 200, and the confidential product roadmap information previously displayed on whiteboard 224 is replaced with a "Welcome!" greeting. The visitor 250 may be wearing an HMD device 50 that utilizes image-based localization to display holographic images at fixed locations in the room 200. To display these images, the HMD device 50 may receive and utilize the previously-generated 3D map 400 that contains 3D points corresponding to the confidential bike prototype 210 and confidential information displayed on the whiteboard 224. In other examples, the 3D map 400 may be retained on computing device 10 and not transmitted to the HMD device 50, with the pose 74 of the device 50 remotely estimated and sent to the HMD device.

As noted above, a person or algorithm that gains access to this 3D point cloud 400 could potentially infer confidential information about the confidential bike prototype 210 and/or confidential information displayed on whiteboard 224. Accordingly, aspects of the present disclosure provide methods for transforming each 3D point of the 3D point cloud into a 3D line to generate a 3D line cloud. Advantageously and as described in more detail below, while a person or algorithm accessing this line cloud may visualize it in a 3D viewer, they will be unable to recognize the underlying geometric structures that gave rise to those 3D lines. Further, the 3D point cloud may be utilized with known solutions for the generalized relative pose problem of finding the relative pose between two generalized cameras to estimate the pose of a user computing device. For example, for an image capture device located on a user computing device, the relative pose of the image capture device with respect to a generalized camera representing the three-dimensional line cloud may be estimated.

With reference now to FIG. 6, a simplified example of a portion of 3D points 300 of the 3D point cloud representing room 200 is provided. In this example, the 3D points 300 correspond to the end pentagonal surface 240 of the box 220 shown in FIG. 2. Each of the 3D points 300 is associated with a 3D location in an x-y-z coordinate system relative to the room 200. With reference now to FIG. 7, to obfuscate the underlying geometry associated with each 3D point 300, each point is transformed into a 3D line 320 that passes through the point. In some examples, for each of the 3D lines 320, a 3D direction for the line is randomly selected independently of the directions of other 3D lines. In this manner, the 3D point cloud is transformed into a collection of 3D lines 320, each with its own direction that is chosen at random. In this manner and with reference now to FIG. 8, the 3D point cloud is transformed into a 3D line cloud 330.

Any algorithm that attempts to infer the structure underlying the 3D line cloud 330 will have to guess the true position of each underlying 3D point on each line. In general, there will be a huge family of plausible solutions. Even in examples where suitable geometric priors may be derived from statistics of real-world scenes, it would be highly unlikely or impossible to disambiguate among the many likely solution candidates, a set that is simply too large to enumerate and visualize.

In some examples, the 3D direction for each of the 3D lines 320 may be selected from a predetermined number of different 3D directions. Any suitable predetermined number of orientations may be established and utilized. For example, 100 different 3D directions may be predetermined and stored by computing device 10. Each of the 3D lines corresponding to a different 3D point may be randomly assigned to one of the 100 different directions. In another example, a random direction may be chosen from 256 predetermined directions, and a 3D point encoded as a (u,v) 2D coordinate and an 8-bit direction. The (u,v) parametrization may be chosen appropriately per direction, such as orthogonal or in other relation to the direction. In this manner, this type of map may be stored in a more compact manner compared to a 3D point cloud map or a 3D line cloud map. 3D points need to be stored using 3 single precision floats, whereas 3D lines need to be stored using 6 single precision floats. This will require 12 or 24 bytes, respectively, per 3D point or 3D line. However, with up to 256 predetermined 3D directions, each 3D line can be stored using 2 single precision floats for the u, v coordinates and 1 byte for the 3D direction index. Thus only 9 bytes are needed per 3D line. In other examples, the directions of each of the 3D lines may be aligned to the direction of the largest uncertainty on the point position.

In some examples, a 3D line cloud comprising the randomly selected directions may be stored and utilized for subsequent pose determinations in the same physical environment. In this manner, the random directions selected for each three-dimensional line may be selected only once for this physical environment. Accordingly, the same 3D line cloud may be reused for multiple pose determinations in the physical environment. In one example, by assigning a random 3D direction vector "d" to a particular 3D point "X" of the 3D point cloud, a 3D line "L" is uniquely defined. In some examples, another arbitrary and different 3D point "Y" on this 3D line L is determined. For example new 3D point Y may be determined by calculating Y=X+s*d, where s is a real number chosen randomly. With new 3D point Y determined, original 3D point X may be discarded and new point Y and direction d may be stored to represent the 3D line L.

Advantageously, this avoids a situation in which a different set of random directions for each three-dimensional line are selected to generate a second, different three-dimensional line cloud corresponding to the same physical environment. In that situation, it will be appreciated that by combining two different three-dimensional maps and intersecting the three-dimensional lines of each map, it may be possible to recover the underlying three-dimensional points of the original three-dimensional map. It follows that by storing the 3D line cloud with the randomly selected directions, and then using this same 3D line cloud with subsequent query features from a subsequent query image of the same physical environment to estimate a subsequent pose of another computing device with respect to the environment, the underlying 3D points of the original 3D map may not be recovered.

In some examples, the direction for each 3D line may be selected to pass through the corresponding 3D point and through an anchor location with the 3D point cloud. In some examples, this anchor location may be an actual 3D point in the 3D point cloud. In this example, the anchor location 3D point may not be used beyond determining the line directions of every other 3D point. In other examples, the anchor location may not correspond to a 3D point in the 3D point cloud, but may be a "virtual" location, such as the centroid of the 3D map.

With reference now to FIG. 9, in one example an anchor location 400 (depicted as a star) may be designated within the three-dimensional point cloud comprising the three-dimensional points 300. For each of the 3D lines 420 passing through each 3D point 300, a direction is selected that passes through the anchor location 400. An example of a 3D line cloud 430 generated using this technique is illustrated in FIG. 10.

Figure 12:
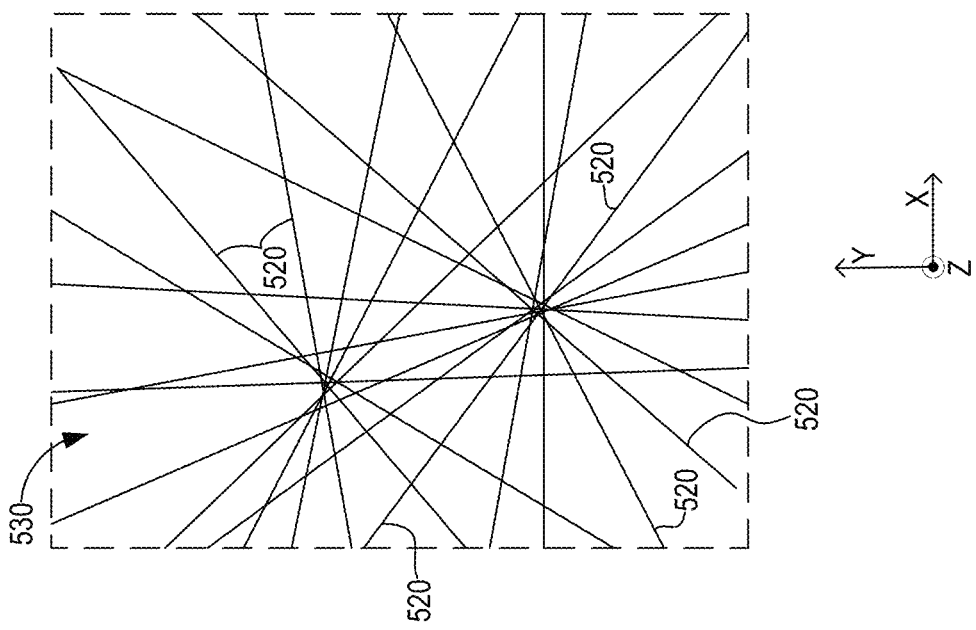
FIG. 12 is a schematic illustration of the three-dimensional line cloud of FIG. 11 with the three-dimensional points removed according to examples of the present disclosure.
Figure 11:
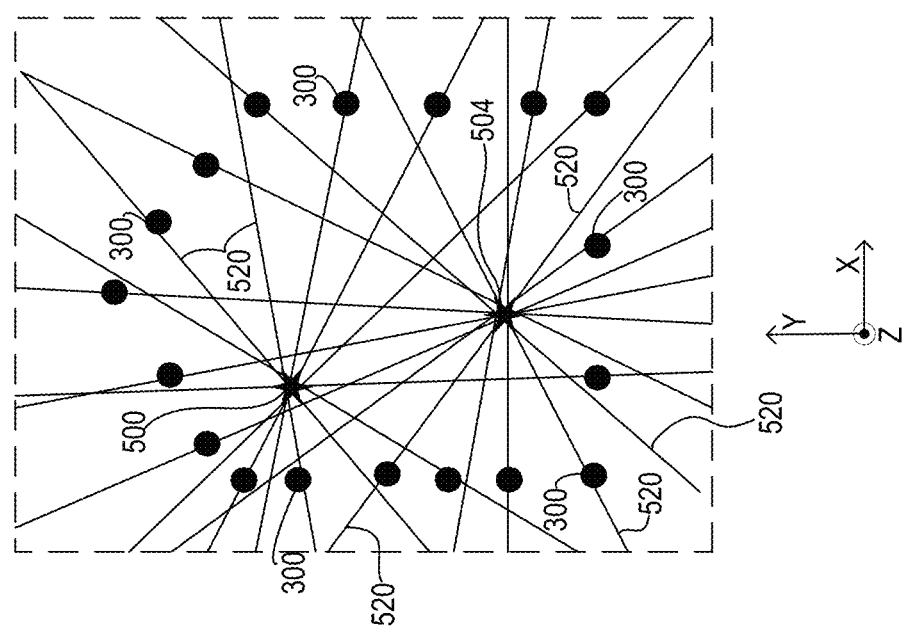
FIG. 11 is a schematic depiction of the three-dimensional points of FIG. 6 with a three-dimensional line passing through each of the points and through one of two anchor locations to form a line cloud according to examples of the present disclosure.

In some examples, the direction for each 3D line may be selected to pass through the corresponding 3D point and through two or more anchor locations with the 3D point cloud. With reference now to FIG. 11, in one example two anchor locations 500 and 504 (depicted as stars) may be designated within the three-dimensional point cloud comprising the three-dimensional points 300. For each of the 3D lines 520 passing through each 3D point 300, a direction is selected that passes through one of the two anchor locations 500 and 504. An example of a 3D line cloud 530 generated using this technique is illustrated in FIG. 12. In other examples, 3, 4 or more anchor locations may be designated and utilized in a similar manner.

In some examples, after transforming the 3D points into the three-dimensional lines to generate a 3D line cloud, the locations of the plurality of 3D points within the three-dimensional map are discarded. In this manner, only the 3D line cloud may be stored on the computing device 10 and/or the HMD device 50, thereby preventing a third party from accessing the original locations of the 3D points used to generate the 3D line cloud.

In some examples and as part of generating the 3D line cloud, the localization program 14 may determine that a subset of the 3D points from the 3D map are located on a plane. Examples may include a poster mounted on a wall, a flat-panel display and other generally planar surfaces. The objects/images represented by such 3D points share the geometry of the support surface on which they are located, such as a wall or whiteboard, which might be permanent fixtures in a scene. During subsequent localization in this environment, it is possible that such plane geometry is revealed. When 3D points for permanent landmarks on the plane are revealed, the plane may be estimated using plane fitting techniques. Once the plane is identified, the previously-present 3D points on confidential planar objects/images located in the plane may be discoverable by intersecting the 3D lines of the 3D line cloud with the plane.

In one example, and with reference again to FIGS. 2 and 3, a subset of 3D points is located on the planar surface of the whiteboard 224. Some of these 3D points are located with and represent the image of the rider and bike prototype and the text of the "Confidential Product Roadmap" and release dates of Super Bike A and Super Bike B.

As shown in FIG. 5, while the image and confidential text has been removed from the whiteboard 224 at this later time, the whiteboard itself remains present in the room 200. In examples where the HMD device 50 worn by visitor 250 receives the previously-generated 3D line cloud of the room 200, it may be possible to determine and recover the 3D points corresponding to the previously-displayed image and confidential text by inferring their position on the plane of the whiteboard 224. For example, because the planar whiteboard 224 remains present in the current scene of FIG. 5, the original 3D points that were previously located on the whiteboard could be determined by identifying the intersection of each 3D line from the 3D line cloud with the plane of the whiteboard. In this manner the true 3D position of these 3D points that correspond to the previously-displayed confidential image and text may be revealed.

Accordingly, and in another potential advantage of the present disclosure, the localization program 14 may determine that a subset of the 3D points from the 3D map are located on a plane. Then, for each 3D point located on the plane, the 3D map may be processed to select a direction for the corresponding 3D line passing through that point that is coplanar with the plane. In other words, for all 3D points associated with a plane in the 3D map, a random 3D line direction is assigned that lies within the associated plane. In this manner, the 3D line and the estimated plane will be virtually coplanar. In absence of noise, an infinite number of possible 3D positions along the 3D line are available. In the presence of noise, the point of intersection typically will be far from the true 3D point location, thereby making the true 3D point locations very difficult to determine. Accordingly, and with reference again to the examples of FIGS. 3 and 5, the images and text previously present on the whiteboard 224 may not be recovered.

In some examples, a plurality of query images of the physical environment may be utilized to estimate a pose of a user computing device with respect to the physical environment. For example and with reference again to FIG. 5, visitor 250 may move HMD device 50 around the room 200 to capture a sequence of query images of the room from different perspectives. Using these images a local query 3D map in the form of a 3D point cloud of the room 200 may be generated. The query 3D map may utilize its own coordinate system. This query 3D map may be used to estimate the pose of all the multiple query images jointly by computing a rigid transformation between the query 3D map coordinate system and the original 3D map coordinate system.

For example, where multiple query images are processed to generate a local query 3D point cloud, image features from the multiple query images are extracted and stored. To compute the camera poses for each of the multiple query images, the local query 3D point cloud and the query image features associated with the 3D points in the query 3D point cloud are utilized. As with single image queries, the query image features are used to "match" the 3D points in the query 3D point cloud to the 3D lines in the 3D map. Additionally, the query 3D image features may be selected in the same manner as with single image queries.

Using a 3D line cloud of a physical environment generated by one of the techniques discussed above, the pose of a user computing device located in the environment may be computed in a variety of manners. With reference again to the example of FIG. 5, the HMD device 50 may capture one or more query images of the room 200, with the query image comprising a plurality of query features that correspond to at least a portion of the room. As noted above, in some examples the HMD device 50 may send the query image(s) 62 to computing device 10 for processing. Using the 3D line 66 cloud and the plurality of query features 92, computing device 10 may estimate a pose 74 of the HMD device 50 with respect to the room 200 and send the pose to the HMD device 50.

To estimate the pose of the HMD device 50, the localization program 14 may determine a set of correspondences between the 2D query features 92 and the 3D lines in the 3D line cloud 66. In some examples, the localization program may use one or more RANSAC-based pose estimation algorithms (or solvers). As described in more detail below, such algorithms may generate and score hypotheses using non-linear minimization techniques to finalize the pose estimation.

Aspects of these algorithms relate to solving the generalized relative pose problem of finding the relative pose between two generalized cameras. Mathematically, each generalized camera may be represented as an arbitrary set of 3D lines. A pinhole camera is a special case where all lines (or rays) pass through a common point. Given a set of line-line correspondences between two generalized cameras, the generalized relative pose problem computes the relative pose (3D rotation and 3D translation directions) under which the first set of lines meets the second set of lines at a set of 3D points, with one 3D point for each pair of corresponding lines. In other words, with the correct relative motion between the two coordinate frames, each pair of corresponding lines in the two generalized cameras will intersect at a 3D point. As described in more detail below, in different examples of pose estimation algorithms, solving the pose requires a different minimum number of line-line correspondences where the 3D lines are in general position.

In the present disclosure, the image capture device (e.g., camera) that captures the query image(s) may be represented as a calibrated pin-hole camera in which the focal length and optical center are known. Accordingly, the query features in the query image(s) may be back-projected to a set of concurrent 3D lines passing through the camera center (pinhole). Therefore, finding the absolute pose of this camera with respect to the 3D line cloud is equivalent to finding the relative pose between this camera and the generalized camera corresponding to the 3D line cloud.

By representing the 3D line cloud as a generalized camera, multiple methods for finding the camera pose given a 3D line cloud may be utilized. As described in more detail below, in different examples different methods for estimating the pose may be utilized based on several factors that each have two possible cases. One potential factor is whether the query image is a single image, or a sequence of images captured from a device while it is moving. Another potential factor is whether the vertical direction in the scene is already known (often available from an on-device accelerometer or inertial measurement unit, or by identifying vertical lines in the query image(s)). Another potential factor in the case of multiple image queries is whether a query 3D map has true scale. Another potential factor is whether an orientation is known due to multiple vanishing directions. It also will be appreciated that in other examples one or more other constraints on the pose that constrain parameters of the transformation may be available and utilized to simplify the pose estimation.

In some examples, a single query image is utilized and the vertical direction is unknown. In these examples, one of several known candidate algorithms may be utilized to estimate the pose of the user computing device as discussed above. For example, one candidate algorithm may utilize a minimum of 6 line-line correspondences between 3D lines in the 3D line cloud and 3D lines determined from the query image as described above. The pose may be solved by computing a 64×64 matrix on closed form and then extracting its eigen-vectors. Additional information regarding this candidate algorithm is available in the publication "Solutions to Minimal Generalized Relative Pose Problems," Stewenius, et al., *Proceedings of 6th workshop on omnidirectional vision Camera Networks and Non-Classical Cameras*, Oct. 21, 2005, the entirety of which is incorporated herein by reference.

Another candidate algorithm that may utilize a single query image and unknown vertical direction with at least 6 line-line correspondences solves the pose by utilizing an iterative rank minimization process directly over 3 parameters of the frame-to-frame rotation. Additional information regarding this candidate algorithm is available in the publication "Efficient Computation of Relative Pose for Multi-Camera Systems," Kneip, et al., *Proceedings of IEEE Conference on Computer Vision and Pattern Recognition*, Jun. 23, 2014, the entirety of which is incorporated herein by reference.

Another candidate algorithm that may be utilized with a single query image where the vertical direction is unknown estimates the pose by utilizing a linear algorithm that solves for a generalized essential matrix and the 6 degree-of-freedom motion of the generalized camera using one equation for each point correspondence. Additional information regarding this candidate algorithm is available in the publication "A Linear Approach to Motion Estimation Using Generalized Camera Models," Li, et al., *Proceedings of IEEE Conference on Computer Vision and Pattern Recognition*, Jun. 23, 2008, the entirety of which is incorporated herein by reference.

In some examples where a single query image is utilized the vertical direction is known. In these examples, a known candidate algorithm that utilizes a 4-point algorithm for determining the relative pose between two generalized cameras may be utilized to estimate the pose of the user computing device as discussed above. In these examples the relative pose problems are formulated as Quadratic Eigenvalue Problems (QEPs). Additional information regarding this candidate algorithm is available in the publication "Solving for Relative Pose with a Partially Known Rotation is a Quadratic Eigenvalue Problem," Sweeney, et al., 2014 $2^{nd}$ *International Conference on 3D Vision*, Jun. 23, 2008, pp. 483-490, the entirety of which is incorporated herein by reference.

Other candidate algorithms that may be utilized with a single query image where the vertical direction is known may estimate the pose using minimal 4-point and linear 8-point algorithms. The minimal 4-point algorithm may be solved with the hidden variable resultant method to yield an 8-degree univariate polynomial that gives up to 8 real solutions. From the linear 8-point algorithm, a degenerated case is identified when the algorithm is solved with the standard Singular Value Decomposition (SVD) method. Additional information regarding these candidate algorithms is available in the publication "Relative Pose Estimation for a Multi-Camera System with Known Vertical Direction," Lee, et al., *Proceedings of IEEE Conference on Computer Vision and Pattern Recognition*, Jun. 23, 2014, the entirety of which is incorporated herein by reference.

In some examples, multiple query images may be available from a moving image capture device. In these examples and as noted above, a different localization strategy may be utilized to build a local map from the query images and then match the 3D query features of the local query map to the 3D lines of the 3D line cloud. For example, a sequence of query images captured from a moving camera first may be processed to generate a local query 3D map (a query 3D point cloud) in its own coordinate system. Next, this query 3D map may be used to compute the pose of all the multiple query image jointly. Additionally, a rigid transformation between the query map coordinate system and the underlying 3D map coordinate system may be computed and utilized.

Where multiple query images are utilized and a query 3D map is reconstructed, the map may or may not have true scale. Depending on the camera, device hardware and the algorithm used to obtain the query reconstruction, the size of the query 3D map or the 3D point cloud may or may not have real-life dimensions. When the dimensions match the real-life scale (e.g., scale is known), pose may be estimated by computing a rigid transformation between the query map coordinate system and the underlying map coordinate system. In the other case when the query 3D map does not have true real-life dimensions, the true scale is unknown. In these examples, the scale factor is also estimated when calculating the underlying camera pose.

It will be appreciated that the issue of known or unknown scale does not occur for a single query image. This is because when the features in the query image are back projected, the features form a bundle of rays that pass through the camera projection center. This bundle of rays may be arbitrarily scaled when calculating the pose of the camera in the underlying 3D map. In other words, if the rays or 3D lines in the bundle are arbitrarily scaled, they will still intersect the 3D lines in the underlying map at the same set of 3D points.

An example of when scale is known occurs with a stereo camera having a rigid camera baseline. The prior knowledge of this baseline allows the reconstruction to be scaled to the true real-life dimensions. In other examples, depth camera or inertial-measurement units may be used to estimate the scale of the reconstruction. In other examples where the query images are captured with a monocular camera, the query 3D map reconstruction will be correct only up to arbitrary scale, and in this case it is necessary to compute the scale along with the pose.

In examples where multiple query images are utilized, the vertical direction is unknown and the scale is known, an algorithm may be utilized that solves for the Generalised 3-point pose of a camera, where the camera can sample rays in an arbitrary but known fashion and is not assumed to perform a central perspective projection. In other words, given three back-projected rays that emanate from the camera in an arbitrary but known fashion, the possible poses of the camera are estimated such that the three rays meet three known world points. Additional information regarding this candidate algorithm is available in the publication "A Minimal Solution to the Generalised 3-Point Pose Problem"," Nister, et al., *Journal of Mathematical Imaging and Vision*, Volume 27, Issue 1, January 2007, the entirety of which is incorporated herein by reference.

In examples where multiple query images are utilized, the vertical direction is known and the scale is known, a candidate 2-point algorithm may be utilized that estimates the absolute pose of a single or multiple-camera system using partial knowledge of the camera orientation. Given an angle-axis representation of SO(3) rotations, knowledge of the rotation axis is assumed and the unknown rotation angle about that axis is solved. Two dimensions of freedom are thereby removed from the rotation and the single remaining dimension of freedom in the rotation and the unknown position are solved. The remaining unknown camera pose parameters are determined by solving a quadratic equation. Additional information regarding this candidate algorithm is available in the publication "Efficient Computation of Absolute Pose for Gravity-Aware Augmented Reality," Sweeney, et al., *Proceedings of IEEE International Symposium on Mixed and Augmented Reality*, Sep. 29, 2015, pp. 19-24, the entirety of which is incorporated herein by reference.

In examples where multiple query images are utilized and both the vertical direction and scale are unknown, a candidate algorithm utilizes a scalable least-squares solution for computing a seven degree-of-freedom similarity transform. The generalized camera model is utilized to compute relative rotation, translation, and scale from 4 or more 2D-3D correspondences. The generalized pose and scale problem is formulated as a minimization of a least squares cost function, and this minimization is solved without iterations or initialization. All minima of the cost function are also obtained. Additional information regarding this candidate algorithm is available in the publication "gDLS: A Scalable Solution to the Generalized Pose and Scale Problem," Sweeney, et al., *European Conference on Computer Vision*, 2014, Part IV, LNCS, Vol. 8692, pp. 16-31, the entirety of which is incorporated herein by reference.

In examples where multiple query images are utilized, the vertical direction is known, and the scale is unknown, a candidate algorithm may be utilized that solves the pose estimation problem of calibrated pinhole and generalized cameras with respect to a Structure-from-Motion (SfM) model by leveraging both 2D-3D correspondences as well as 2D-2D correspondences. This RANSAC-based approach automatically chooses the best type of solver to use at each iteration in a data driven manner. Additional information regarding this candidate algorithm is available in the publication "Hybrid Camera Pose Estimation," Camposeco, et al., *Proceedings of the IEEE Conference on Computer Vision and Pattern Recognition*, 2018, pp. 136-144, the entirety of which is incorporated herein by reference.

In some examples, each of the 3D points of a 3D point cloud map may be transformed into a 3D plane containing the point to generate a 3D plane cloud. For example and with reference to FIG. 8, each of the 3D lines 320 would be contained in a 3D plane. As described above with respect to the 3D lines, the direction of each 3D plane (e.g., the 3D plane normal vector) may be chosen randomly and, in some examples, may be selected from a predetermined set of 3D directions. In a different example, the 3D map may also contain 3D line segments that may represent one or more of straight line patterns in the scene, straight line edges, boundaries of planar surfaces, or straight-line creases between planar surfaces in the scene. Each such 3D line segment also may be transformed into a randomly oriented 3D plane that passes exactly through the 3D line segment.

Similar to a 3D line cloud, these planes would form a 3D plane cloud that hides the underlying scene geometry while still allowing pose estimation via one or more of the techniques described herein. For example, where 6 plane-to-point correspondences are available, a pose estimation method may estimate a 3D orientation and a 3D translation such that the 3D points corresponding to the 6 rays with depth measurements from the depth camera lie on the 6 associated 3D planes. In other examples and as explained above, where additional pose constraints (factors) are known (such as whether the vertical direction in the scene is known, whether a query 3D map has true scale, or other pose constraints) the pose may be estimated with fewer than 6 plane-to-point correspondences. Accordingly and in these examples, a single depth query image may be utilized to estimate the pose of the depth camera. For example and as noted above, a user computing device such as an HMD device may include a time-of-flight sensor for capturing depth image data.

In other examples, multiple 2D query images captured by an image capture device (such as an RGB camera) may be utilized with a 3D plane cloud in a similar manner to estimate the pose of the image capture device. As described above, the multiple query images may comprise a plurality of query features that correspond to at least a portion of the physical environment. Using the three-dimensional plane cloud and the plurality of query features, the pose of the image capture device with respect to the physical environment may be estimated.

Figure 13A:
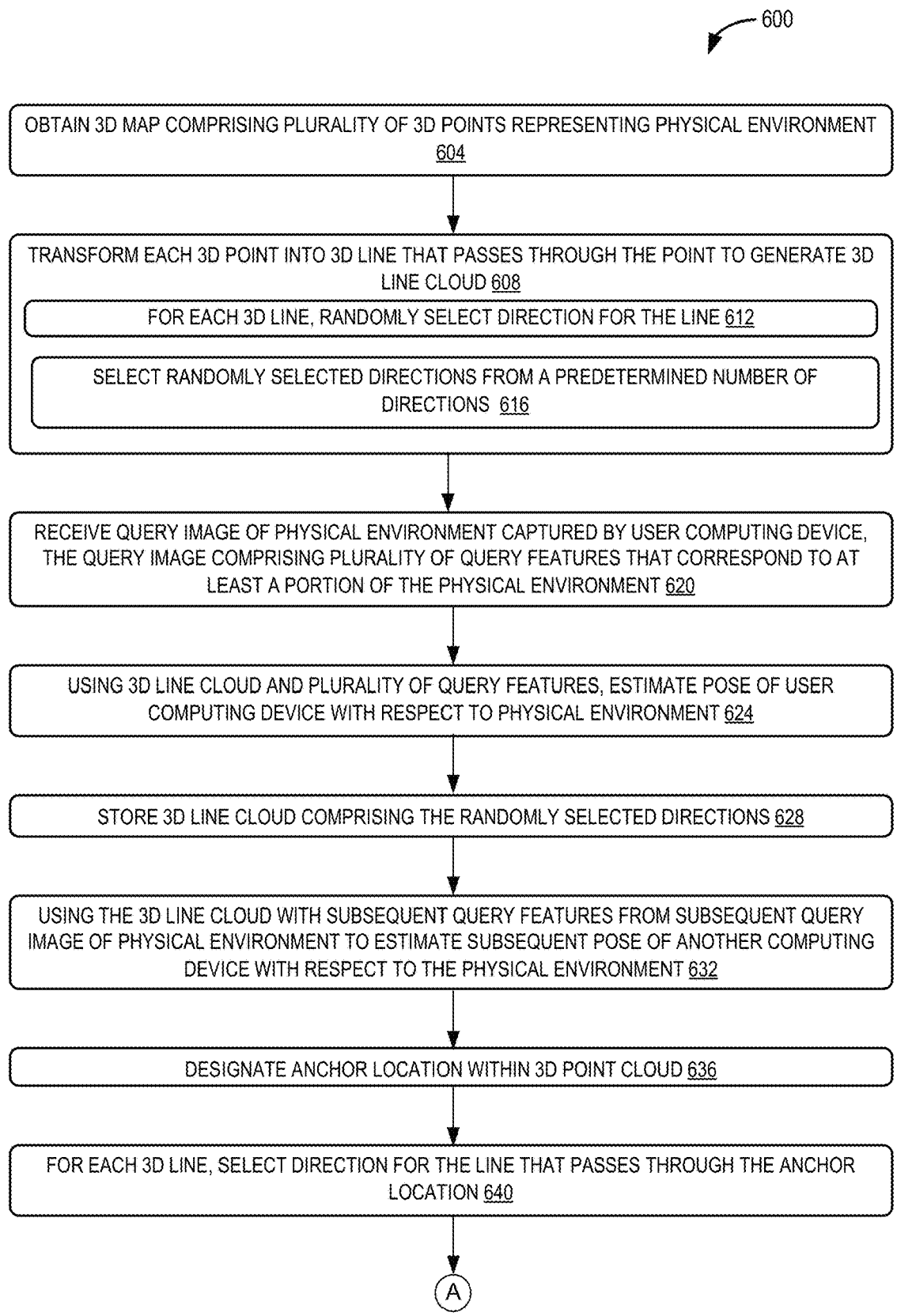
FIGS. 13A and 13B show a flow diagram illustrating an example method for using a three-dimensional line cloud to determine a pose according to examples of the present disclosure.
Figure 13B:
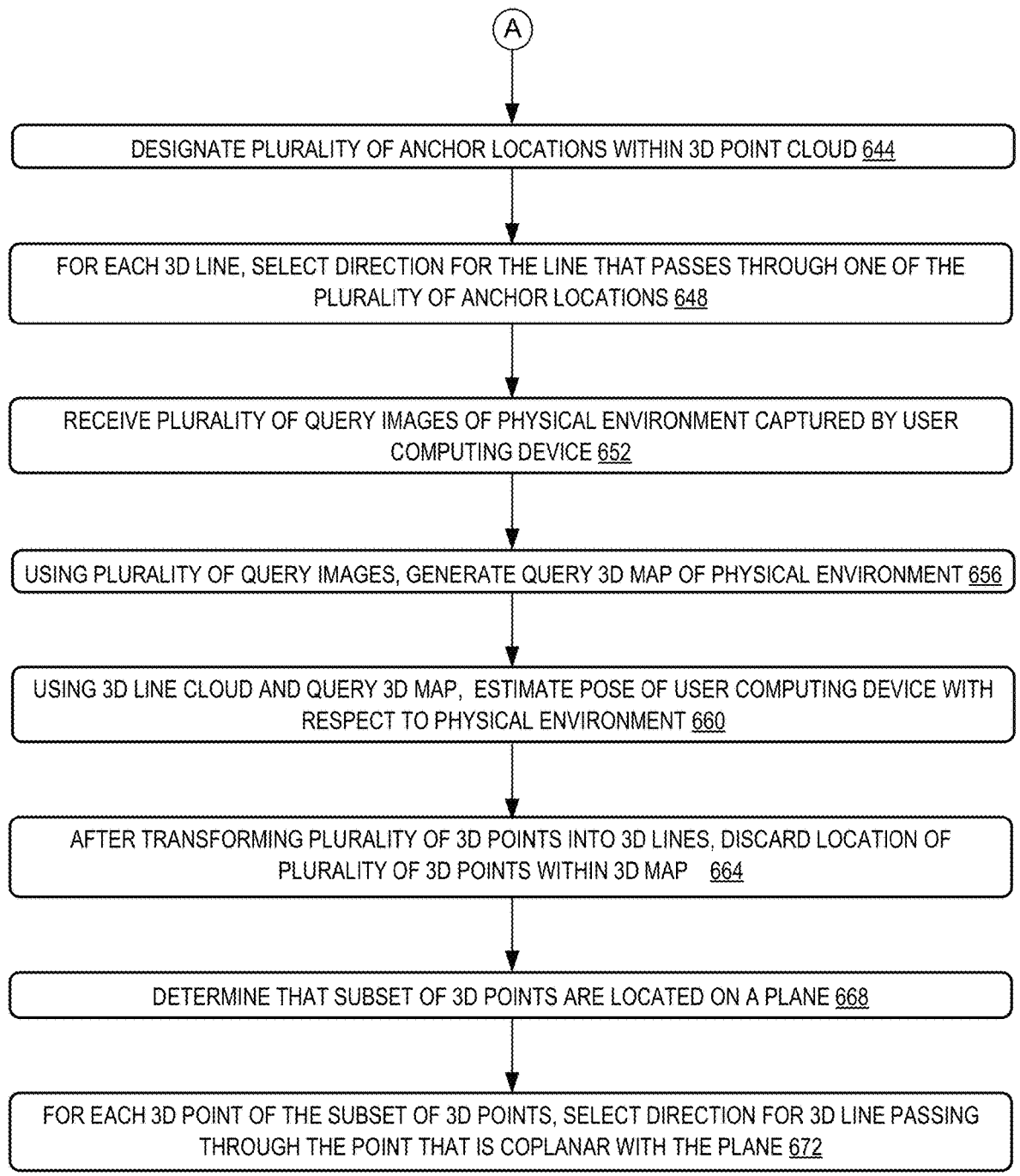

FIGS. 13A and 13B illustrate an example method 600 for using a three-dimensional line cloud to estimate a pose of a user computing device according to examples of the present disclosure. In some examples method 600 may be performed by computing device 10 or HMD device 50. The following description of method 600 is provided with reference to the software and hardware components described herein and shown in FIGS. 1-12 and 14. It will be appreciated that method 600 also may be performed in other contexts using other suitable hardware and software components.

With reference to FIG. 13A, at 604 the method 600 may include obtaining a three-dimensional map comprising a plurality of three-dimensional points representing a physical environment. At 608 the method 600 may include transforming each three-dimensional point into a three-dimensional line that passes through the point to generate a three-dimensional line cloud. At 612 the method 600 may include, for each of the three-dimensional lines, randomly selecting a direction for the three-dimensional line. At 616 the method 600 may include selecting the randomly selected directions from a predetermined number of directions.

At 620 the method 600 may include receiving a query image of the physical environment captured by a user computing device, the query image comprising a plurality of query features that correspond to at least a portion of the physical environment. At 624 the method 600 may include, using the three-dimensional line cloud and the plurality of query features, estimating a pose of the user computing device with respect to the physical environment. At 628 the method 600 may include storing the three-dimensional line cloud comprising the randomly selected directions. At 632 the method 600 may include using the three-dimensional line cloud with subsequent query features from a subsequent query image of the physical environment to estimate a subsequent pose of another computing device with respect to the physical environment.

At 636 the method 600 may include designating an anchor location within a three-dimensional point cloud comprising the plurality of three-dimensional points. At 640 the method 600 may include, for each of the three-dimensional lines, selecting a direction for the three-dimensional line that passes through the anchor location. With reference now to FIG. 13B, at 644 the method 600 may include designating a plurality of anchor locations within a three-dimensional point cloud comprising the plurality of three-dimensional points. At 648 the method 600 may include, for each of the three-dimensional lines, selecting a direction for the three-dimensional line that passes through one of the plurality of anchor locations.

At 652 the method 600 may include receiving a plurality of query images of the physical environment captured by the user computing device. At 656 the method 600 may include, using the plurality of query images, generating a query three-dimensional map of the physical environment. At 660 the method 600 may include, using the three-dimensional line cloud and the query three-dimensional map, estimating a pose of the user computing device with respect to the physical environment. At 664 the method 600 may include, after transforming the plurality of three-dimensional points into the three-dimensional lines, discarding the locations of the plurality of three-dimensional points within the three-dimensional map. At 668 the method 600 may include determining that a subset of the three-dimensional points is located on a plane. At 672 the method 600 may include, for each three-dimensional point of the subset of three-dimensional points, selecting a direction for the three-dimensional line passing through the point that is coplanar with the plane.

It will be appreciated that method 600 is provided by way of example and is not meant to be limiting. Therefore, it is to be understood that method 600 may include additional and/or alternative steps relative to those illustrated in FIGS. 13A and 13B. Further, it is to be understood that method 600 may be performed in any suitable order. Further still, it is to be understood that one or more steps may be omitted from method 600 without departing from the scope of this disclosure.

In some embodiments, the methods and processes described herein may be tied to a computing system of one or more computing devices. Such methods and processes may be implemented as a computer-application program or service, an application-programming interface (API), a library, and/or other computer-program product.

Figure 14:
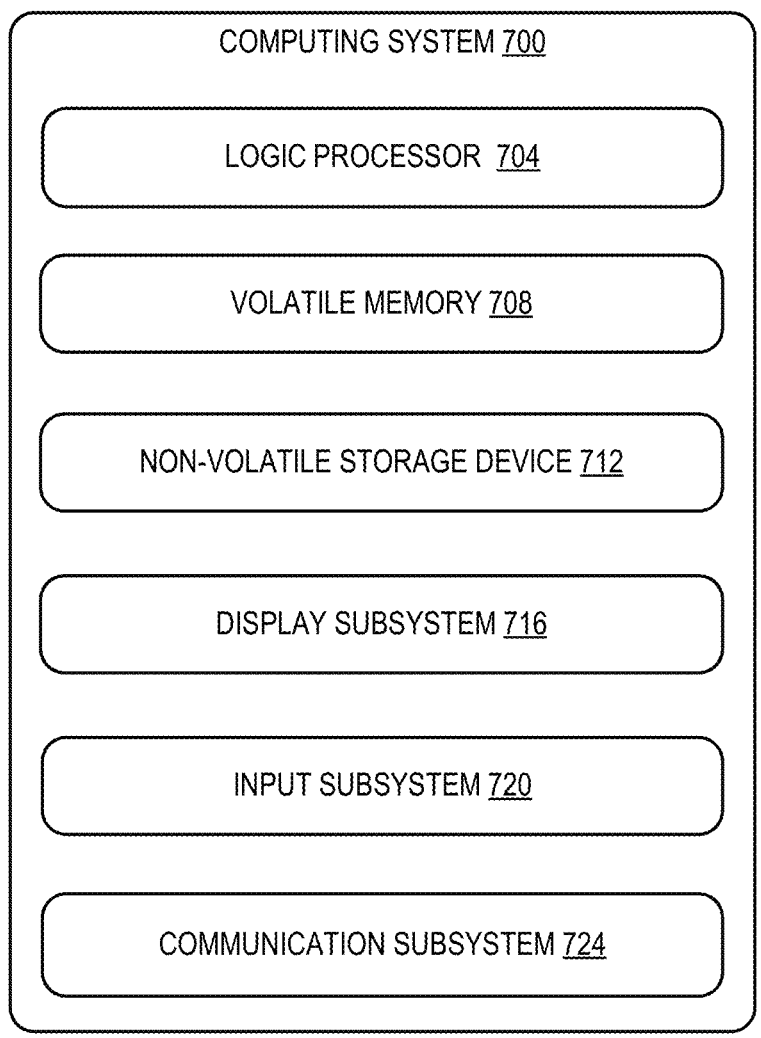
FIG. 14 is a schematic depiction of an example computing system according to examples of the present disclosure.

FIG. 14 schematically shows a non-limiting embodiment of a computing system 700 that can enact one or more of the methods and processes described above. Computing system 700 is shown in simplified form. Computing device 10, HMD device 50, robot 80, UAV 84 and self-driving automobile 88 may comprise or take the form of computing system 700.

Computing system 700 includes a logic processor 704, volatile memory 708, and a non-volatile storage device 712. Computing system 700 may optionally include a display subsystem 716, input subsystem 720, communication subsystem 724, and/or other components not shown in FIG. 14.

Logic processor 704 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 704 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 704 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 704 may be virtualized and executed by remotely accessible, networked computing devices configured in a cloud-computing configuration. In such a case, these virtualized aspects may be run on different physical logic processors of various different machines.

Volatile memory 708 may include physical devices that include random access memory. Volatile memory 708 is typically utilized by logic processor 704 to temporarily store information during processing of software instructions. It will be appreciated that volatile memory 708 typically does not continue to store instructions when power is cut to the volatile memory.

Non-volatile storage device 712 includes one or more physical devices configured to hold instructions executable by the logic processors to implement the methods and processes described herein. When such methods and processes are implemented, the state of non-volatile storage device 712 may be transformed—e.g., to hold different data.

Non-volatile storage device 712 may include physical devices that are removable and/or built-in. Non-volatile storage device 712 may include optical memory (CD, DVD, HD-DVD, Blu-Ray Disc, etc.), semiconductor memory (ROM, EPROM, EEPROM, FLASH memory, etc.), and/or magnetic memory (hard-disk drive, floppy-disk drive, tape drive, MRAM, etc.), or other mass storage device technology. Non-volatile storage device 712 may include nonvolatile, dynamic, static, read/write, read-only, sequential-access, location-addressable, file-addressable, and/or content-addressable devices. It will be appreciated that non-volatile storage device 712 is configured to hold instructions even when power is cut to the non-volatile storage device.

Aspects of logic processor 704, volatile memory 708, and non-volatile storage device 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 700 implemented to perform a particular function. In some cases, a program or application may be instantiated via logic processor 704 executing instructions held by non-volatile storage device 712, using portions of volatile memory 708. It will be understood that different programs or applications may be instantiated from the same service, code block, object, library, routine, API, function, etc. Likewise, the same program or application may be instantiated by different services, code blocks, objects, routines, APIs, functions, etc. The terms "program" and "application" encompasses individual or groups of executable files, data files, libraries, drivers, scripts, database records, etc.

When included, display subsystem 716 may be used to present a visual representation of data held by non-volatile storage device 712. As the herein described methods and processes change the data held by the non-volatile storage device, and thus transform the state of the non-volatile storage device, the state of display subsystem 716 may likewise be transformed to visually represent changes in the underlying data. Display subsystem 716 may include one or more display devices utilizing virtually any type of technology. Such display devices may be combined with logic processor 704, volatile memory 708, and/or non-volatile storage device 712 in a shared enclosure, or such display devices may be peripheral display devices.

When included, input subsystem 720 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include one or more microphones for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; electric-field sensing componentry for assessing brain activity; and/or any other suitable sensor.

When included, communication subsystem 724 may be configured to communicatively couple computing system 700 with one or more other computing devices. Communication subsystem 724 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

The following paragraphs provide additional support for the claims of the subject application. One aspect provides a computing device, comprising: a processor; and a memory holding instructions executable by the processor to: obtain a three-dimensional map comprising a plurality of three-dimensional points representing a physical environment; transform each three-dimensional point into a three-dimensional line that passes through the point to generate a three-dimensional line cloud; receive a query image of the physical environment captured by a user computing device, the query image comprising a plurality of query features that correspond to at least a portion of the physical environment; and using the three-dimensional line cloud and the plurality of query features, estimate a pose of the user computing device with respect to the physical environment. The computing device may additionally or alternatively include, wherein the instructions are executable to, for each of the three-dimensional lines, randomly select a direction for the three-dimensional line. The computing device may additionally or alternatively include, wherein the instructions are executable to: store the three-dimensional line cloud comprising the randomly selected directions; and use the three-dimensional line cloud with subsequent query features from a subsequent query image of the physical environment to estimate a subsequent pose of another computing device with respect to the physical environment. The computing device may additionally or alternatively include, wherein each of the randomly selected directions is selected from a predetermined number of directions. The computing device may additionally or alternatively include, wherein the instructions are executable to: designate an anchor location within a three-dimensional point cloud comprising the plurality of three-dimensional points; and for each of the three-dimensional lines, select a direction for the three-dimensional line that passes through the anchor location. The computing device may additionally or alternatively include, wherein the instructions are executable to: designate a plurality of anchor locations within a three-dimensional point cloud comprising the plurality of three-dimensional points; and for each of the three-dimensional lines, select a direction for the three-dimensional line that passes through one of the plurality of anchor locations. The computing device may additionally or alternatively include, wherein the instructions are executable to: receive a plurality of query images of the physical environment captured by the user computing device; using the plurality of query images, generate a query three-dimensional map comprising a plurality of query three-dimensional points representing the physical environment; and using the three-dimensional line cloud and the query three-dimensional map, estimate a pose of the user computing device with respect to the physical environment. The computing device may additionally or alternatively include, wherein estimating the pose of the user computing device with respect to the physical environment using the plurality of three-dimensional points computed from the plurality of query images comprises finding an absolute pose of a generalized camera representing the three-dimensional line cloud with respect to the plurality of query three-dimensional points in the query three-dimensional map. The computing device may additionally or alternatively include, wherein the instructions are executable to, after transforming the plurality of three-dimensional points into the three-dimensional lines, discard locations of the plurality of three-dimensional points within the three-dimensional map. The computing device may additionally or alternatively include, wherein the instructions are executable to: determine that a subset of the three-dimensional points is located on a plane; and for each three-dimensional point of the subset of three-dimensional points, select a direction for the three-dimensional line passing through the point that is coplanar with the plane. The computing device may additionally or alternatively include, wherein estimating the pose of the user computing device with respect to the physical environment using query features extracted from the query image captured by an image capture device of the user computing device comprises finding a relative pose of the image capture device with respect to a generalized camera representing the three-dimensional line cloud.

Another aspect provides a method, comprising: obtaining a three-dimensional map comprising a plurality of three-dimensional points representing a physical environment; transforming each three-dimensional point into a three-dimensional line that passes through the point to generate a three-dimensional line cloud; receiving a query image of the physical environment captured by a user computing device, the query image comprising a plurality of query features that correspond to at least a portion of the physical environment; and using the three-dimensional line cloud and the plurality of query features, estimating a pose of the user computing device with respect to the physical environment. The method may additionally or alternatively include, for each of the three-dimensional lines, randomly selecting a direction for the three-dimensional line. The method may additionally or alternatively include, selecting the randomly selected directions from a predetermined number of directions. The method may additionally or alternatively include, storing the three-dimensional line cloud comprising the randomly selected directions; and using the three-dimensional line cloud with subsequent query features from a subsequent query image of the physical environment to estimate a subsequent pose of another computing device with respect to the physical environment. The method may additionally or alternatively include, designating a plurality of anchor locations within a three-dimensional point cloud comprising the plurality of three-dimensional points; and for each of the three-dimensional lines, selecting a direction for the three-dimensional line that passes through one of the plurality of anchor locations. The method may additionally or alternatively include, receiving a plurality of query images of the physical environment captured by the user computing device; using the plurality of query images, generating a query three-dimensional map comprising a plurality of query three-dimensional points representing the physical environment; and using the three-dimensional line cloud and the query three-dimensional map, estimating a pose of the user computing device with respect to the physical environment. The method may additionally or alternatively include, after transforming the plurality of three-dimensional points into the three-dimensional lines, discarding locations of the plurality of three-dimensional points within the three-dimensional map. The method may additionally or alternatively include, determining that a subset of the three-dimensional points is located on a plane; and for each three-dimensional point of the subset of three-dimensional points, selecting a direction for the three-dimensional line passing through the point that is coplanar with the plane.

Another aspect provides a computing device, comprising: a processor; and a memory holding instructions executable by the processor to: obtain a three-dimensional map comprising a plurality of three-dimensional points representing a physical environment; transform each three-dimensional point into a three-dimensional plane that contains the point to generate a three-dimensional plane cloud; receive at least one query image of the physical environment captured by an image capture device of a user computing device, the at least one query image comprising a plurality of query features that correspond to at least a portion of the physical environment; and using the three-dimensional plane cloud and the plurality of query features of the at least one query image, estimate a pose of the user computing device with respect to the physical environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and sub combinations of the various processes, systems and configurations, and other features, functions, acts, and/or properties disclosed herein, as well as any and all equivalents thereof.

The invention claimed is:

1. A computing device, comprising:
a processor; and
a memory holding instructions executable by the processor to:
obtain a three-dimensional map comprising a plurality of three-dimensional points representing a physical environment;
transform each three-dimensional point into a three-dimensional line that passes through the three-dimensional point to generate a three-dimensional line cloud;
after transforming the plurality of three-dimensional points into the three-dimensional lines, discard locations of the plurality of three-dimensional points within the three-dimensional map;
receive a query image of the physical environment captured by a user computing device, the query image comprising a plurality of query features that correspond to at least a portion of the physical environment; and
using the three-dimensional line cloud and the plurality of query features, and not using the locations of the plurality of three-dimensional points, estimate a pose of the user computing device with respect to the physical environment.

2. The computing device of claim 1, wherein the instructions are executable to randomly select a direction for each of the three-dimensional lines.

3. The computing device of claim 2, wherein the instructions are executable to:
store the three-dimensional line cloud comprising the randomly selected directions; and
use the three-dimensional line cloud with subsequent query features from a subsequent query image of the physical environment to estimate a subsequent pose of another computing device with respect to the physical environment.

4. The computing device of claim 2, wherein each of the randomly selected directions is selected from a predetermined number of directions.

5. The computing device of claim 1, wherein the instructions are executable to:
designate an anchor location within a three-dimensional point cloud comprising the plurality of three-dimensional points; and
for each of the three-dimensional lines, select a direction for the three-dimensional line that passes through the anchor location.

6. The computing device of claim 1, wherein the instructions are executable to:
designate a plurality of anchor locations within a three-dimensional point cloud comprising the plurality of three-dimensional points; and
for each of the three-dimensional lines, select a direction for the three-dimensional line that passes through one of the plurality of anchor locations.

7. The computing device of claim 1, wherein the instructions are executable to:
receive a plurality of query images of the physical environment captured by the user computing device;
using the plurality of query images, generate a query three-dimensional map comprising a plurality of query three-dimensional points representing the physical environment; and
using the three-dimensional line cloud and the query three-dimensional map, estimate a pose of the user computing device with respect to the physical environment.

8. The computing device of claim 7, wherein estimating the pose of the user computing device with respect to the physical environment using the plurality of three-dimensional points computed from the plurality of query images comprises finding an absolute pose of a generalized camera representing the three-dimensional line cloud with respect to the plurality of query three-dimensional points in the query three-dimensional map.

9. The computing device of claim 1, wherein the instructions are executable to:
determine that a subset of the three-dimensional points is located on a plane; and
for each three-dimensional point of the subset of three-dimensional points, select a direction for the three-dimensional line passing through the point that is coplanar with the plane.

10. The computing device of claim 1, wherein estimating the pose of the user computing device with respect to the physical environment using query features extracted from the query image captured by an image capture device of the user computing device comprises finding a relative pose of the image capture device with respect to a generalized camera representing the three-dimensional line cloud.

11. A method, comprising:
obtaining a three-dimensional map comprising a plurality of three-dimensional points representing a physical environment;
transforming each three-dimensional point into a three-dimensional line that passes through the three-dimensional point to generate a three-dimensional line cloud;
after transforming the plurality of three-dimensional points into the three-dimensional lines, discarding locations of the plurality of three-dimensional points within the three-dimensional map;
receiving a query image of the physical environment captured by a user computing device, the query image comprising a plurality of query features that correspond to at least a portion of the physical environment; and
using the three-dimensional line cloud and the plurality of query features, estimating a pose of the user computing device with respect to the physical environment.

12. The method of claim 11, further comprising randomly selecting a direction for each of the three-dimensional lines.

13. The method of claim 12, further comprising selecting the randomly selected directions from a predetermined number of directions.

14. The method of claim 12, further comprising:
storing the three-dimensional line cloud comprising the randomly selected directions; and
using the three-dimensional line cloud with subsequent query features from a subsequent query image of the physical environment to estimate a subsequent pose of another computing device with respect to the physical environment.

15. The method of claim 11, further comprising:
designating a plurality of anchor locations within a three-dimensional point cloud comprising the plurality of three-dimensional points; and
for each of the three-dimensional lines, selecting a direction for the three-dimensional line that passes through one of the plurality of anchor locations.

16. The method of claim 11, further comprising:
receiving a plurality of query images of the physical environment captured by the user computing device;
using the plurality of query images, generating a query three-dimensional map comprising a plurality of query three-dimensional points representing the physical environment; and
using the three-dimensional line cloud and the query three-dimensional map, estimating a pose of the user computing device with respect to the physical environment.

17. The method of claim 11, further comprising:
determining that a subset of the three-dimensional points is located on a plane; and
for each three-dimensional point of the subset of three-dimensional points, selecting a direction for the three-dimensional line passing through the point that is coplanar with the plane.

* * * * *